(12) United States Patent
Lahr et al.

(10) Patent No.: US 12,375,626 B2
(45) Date of Patent: *Jul. 29, 2025

(54) SYSTEMS AND METHODS FOR GENERATING BOOKMARK VIDEO FINGERPRINTS

(71) Applicant: Synergy Sports Technology, LLC, Tempe, AZ (US)

(72) Inventors: Nils B. Lahr, Snoqualmie, WA (US); Garrick C. Barr, Anacortes, WA (US)

(73) Assignee: SYNERGY SPORTS TECHNOLOGY, LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,045

(22) Filed: Jan. 3, 2024

(65) Prior Publication Data

US 2024/0137468 A1 Apr. 25, 2024

Related U.S. Application Data

(63) Continuation of application No. 17/884,964, filed on Aug. 10, 2022, now Pat. No. 11,902,711, which is a
(Continued)

(51) Int. Cl.
*G06K 9/00* (2022.01)
*G06F 3/0482* (2013.01)
(Continued)

(52) U.S. Cl.
CPC ....... *H04N 7/17318* (2013.01); *G06F 3/0482* (2013.01); *G06F 3/04842* (2013.01);
(Continued)

(58) Field of Classification Search
CPC ........ G06T 1/0021; G06T 2207/10016; G06V 20/46; G06V 20/47; G06V 20/40;
(Continued)

(56) References Cited

U.S. PATENT DOCUMENTS

2002/0078144 A1* 6/2002 Lamkin ................. H04L 67/02
348/E7.071
2003/0052918 A1* 3/2003 Drane ................. G06F 16/9562
715/764
(Continued)

*Primary Examiner* — Atiba O Fitzpatrick
(74) *Attorney, Agent, or Firm* — Richard T. Black; FisherBroyles, LLP

(57) ABSTRACT

Systems and methods for replacing original media bookmarks of at least a portion of a digital media file with replacement bookmarks is described. A media fingerprint engine detects the location of the original fingerprints associated with the portion of the digital media file and a region analysis algorithm characterizes regions of media file spanning the location of the original bookmarks by data class types. The replacement bookmarks are associated with the data class types and are overwritten or otherwise are substituted for the original bookmarks. The replacement bookmarks then are subjected to a fingerprint matching algorithm that incorporates media timeline and media related metadata.

13 Claims, 9 Drawing Sheets

Related U.S. Application Data continuation of application No. 16/653,904, filed on Oct. 15, 2019, now Pat. No. 11,450,109, which is a continuation of application No. 16/228,511, filed on Dec. 20, 2018, now Pat. No. 10,445,588, which is a continuation of application No. 15/669,736, filed on Aug. 4, 2017, now Pat. No. 10,198,638, which is a continuation of application No. 15/265,452, filed on Sep. 14, 2016, now Pat. No. 9,754,170, which is a continuation of application No. 14/725,834, filed on May 29, 2015, now Pat. No. 9,449,232, which is a continuation of application No. 14/251,139, filed on Apr. 11, 2014, now Pat. No. 9,070,187, which is a continuation of application No. 13/572,497, filed on Aug. 10, 2012, now Pat. No. 8,737,681, which is a continuation of application No. 12/180,419, filed on Jul. 25, 2008, now Pat. No. 8,265,333.

(60) Provisional application No. 60/952,528, filed on Jul. 27, 2007, provisional application No. 60/952,514, filed on Jul. 27, 2007.

(51) Int. Cl.

| | |
|---|---|
| *G06F 3/04842* | (2022.01) |
| *G06F 16/182* | (2019.01) |
| *G06F 16/583* | (2019.01) |
| *G06F 16/78* | (2019.01) |
| *G06F 16/783* | (2019.01) |
| *G06F 16/955* | (2019.01) |
| *G06F 16/958* | (2019.01) |
| *G06F 18/22* | (2023.01) |
| *G06T 1/00* | (2006.01) |
| *G06T 7/215* | (2017.01) |
| *G06V 20/40* | (2022.01) |
| *G10L 21/00* | (2013.01) |
| *H04L 67/02* | (2022.01) |
| *H04L 67/06* | (2022.01) |
| *H04L 67/10* | (2022.01) |
| *H04N 7/173* | (2011.01) |
| *H04N 21/222* | (2011.01) |
| *H04N 21/239* | (2011.01) |
| *H04N 21/431* | (2011.01) |
| *H04N 21/432* | (2011.01) |
| *H04N 21/433* | (2011.01) |
| *H04N 21/442* | (2011.01) |
| *H04N 21/4627* | (2011.01) |
| *H04N 21/472* | (2011.01) |
| *H04N 21/4782* | (2011.01) |
| *H04N 21/81* | (2011.01) |
| *H04N 21/8358* | (2011.01) |
| *H04N 21/84* | (2011.01) |

(52) U.S. Cl.
CPC ........ *G06F 16/183* (2019.01); *G06F 16/5838* (2019.01); *G06F 16/78* (2019.01); *G06F 16/7847* (2019.01); *G06F 16/7867* (2019.01); *G06F 16/9562* (2019.01); *G06F 16/958* (2019.01); *G06F 18/22* (2023.01); *G06T 1/0021* (2013.01); *G06T 7/215* (2017.01); *G06V 20/40* (2022.01); *G06V 20/48* (2022.01); *G10L 21/00* (2013.01); *H04L 67/02* (2013.01); *H04L 67/06* (2013.01); *H04L 67/10* (2013.01); *H04N 21/2223* (2013.01); *H04N 21/2393* (2013.01); *H04N 21/4312* (2013.01); *H04N 21/4325* (2013.01); *H04N 21/4334* (2013.01); *H04N 21/44236* (2013.01); *H04N 21/4627* (2013.01); *H04N 21/47214* (2013.01); *H04N 21/4782* (2013.01); *H04N 21/812* (2013.01); *H04N 21/8173* (2013.01); *H04N 21/8358* (2013.01); *H04N 21/84* (2013.01); *G06T 2207/10016* (2013.01)

(58) Field of Classification Search
CPC ........ G06V 20/41; G06V 20/42; G06V 20/43; G06V 20/44; G06V 20/48; G06V 20/49; H04N 21/4627; H04N 21/8358; H04N 21/84; H04N 21/8402; H04N 21/8405; G06F 16/9562; G10L 21/00–18; H04H 60/56; H04H 60/58; H04H 60/59; H04H 60/35; H04H 60/37; H04H 60/372; H04H 60/375; H04H 60/377
See application file for complete search history.

(56) References Cited

U.S. PATENT DOCUMENTS

| | | | |
|---|---|---|---|
| 2004/0073610 A1* | 4/2004 | Terada | H04L 67/1095 709/219 |
| 2005/0149968 A1* | 7/2005 | Konig | H04N 21/25891 348/E7.06 |
| 2005/0172312 A1* | 8/2005 | Lienhart | H04N 21/44008 725/19 |
| 2005/0177847 A1* | 8/2005 | Konig | H04N 21/2143 725/38 |
| 2005/0182828 A1* | 8/2005 | Lamkin | H04N 21/23614 348/E7.071 |
| 2006/0187358 A1* | 8/2006 | Lienhart | H04N 21/812 348/661 |
| 2006/0195859 A1* | 8/2006 | Konig | H04N 21/44016 382/199 |
| 2006/0195860 A1* | 8/2006 | Eldering | H04N 5/782 382/206 |
| 2008/0126919 A1* | 5/2008 | Uskali | H04N 21/8455 707/E17.009 |

* cited by examiner

SYSTEMS AND METHODS FOR GENERATING BOOKMARK VIDEO FINGERPRINTS

CROSS REFERENCE TO RELATED APPLICATIONS

This application is a continuation of U.S. patent application Ser. No. 17/884,964 filed Aug. 10, 2022; which is a continuation of U.S. patent application Ser. No. 16/653,904 filed Oct. 15, 2019, now U.S. Pat. No. 11,450,109; which is a continuation of U.S. patent application Ser. No. 16/228,511 filed Dec. 20, 2018, now U.S. Pat. No. 10,445,588; which is a continuation of U.S. patent application Ser. No. 15/669,736 filed Aug. 4, 2017, now U.S. Pat. No. 10,198,638; which is a continuation of U.S. patent application Ser. No. 15/265,452 filed Sep. 14, 2016, now U.S. Pat. No. 9,754,170; which is a continuation of U.S. patent application Ser. No. 14/725,834 filed May 29, 2015, now U.S. Pat. No. 9,449,232 issued Sep. 20, 2016; which is a continuation of U.S. patent application Ser. No. 14/251,139 filed Apr. 11, 2014, now U.S. Pat. No. 9,070,187 issued Jun. 30, 2015; which is a continuation of U.S. patent application Ser. No. 13/572,497 filed Aug. 10, 2012, now U.S. Pat. No. 8,737,681 issued May 27, 2014; which is a continuation of U.S. patent application Ser. No. 12/180,419 filed Jul. 25, 2008, now U.S. Pat. No. 8,265,333 issued Sep. 11, 2012; and which claims priority to U.S. Provisional Application Nos. 60/952,514 filed Jul. 27, 2007 and 60/952,528 filed Jul. 27, 2007. This application incorporates by reference in its entirety U.S. Provisional Application No. 60/944,765 filed Jun. 18, 2007. All of the aforementioned applications are incorporated by reference herein in their entireties.

FIELD OF THE INVENTION

The field relates to generating video and audio fingerprints.

BACKGROUND OF THE INVENTION

Video fingerprinting is a type of a digital watermark utilized by content providers to protect their copyrighted video assets without the benefit of Digital Rights Management (DRM) or other proactive methods of providing security for video content. Video content providers will broadcast and/or distribute their content through traditional real-time broadcasting systems, such as satellite or cable television, or as files or streaming media across the Internet. Viewers can utilize third party devices, such as a Data Video Recorder (DVR), for example a TiVo, to record and store broadcasts, while other system exist for saving streaming media to a file or copying a video file from another network location. Peer to peer (P2P) programs exist for enabling decentralized sharing of files regardless of their source or copyright status. Video fingerprinting has been designed to enable a content provider to generate a unique fingerprint based on processing the entire broadcast or small portions of it. The fingerprint can then be used by processing suspect video sources for a fingerprint match between the original source and the suspect copy to ascertain occurrences of unauthorized duplication of the original source content.

Copyright infringement is not the only goal of video fingerprinting as such fingerprinting methods and algorithms are utilized to review whether source and copied video are different. Fingerprinting systems and methods that are designed to detect and determine differences in video and audio characteristics between original or authorized media content and copied or duplicated or otherwise modified media content often employ fingerprinting technology. Media files can be defined by inherent characteristics such as frame rates for the video portion of media files and bitrates for the audio portion of media files. Fingerprinting can analyze the differences in video frame rates and/or audio bitrates from separate media sources and ascertain the extent of matching of frame rates and/or bitrates between separate media sources. That is, the fingerprint matching can be defined in terms of a percent hit rate of the original media content fingerprint to the fingerprint found from a media copy. Such fingerprinting systems and methods often cannot be readily adapted to accommodate the large modifications to the original media broadcast which typical do not occur when the video source and/or audio sources are being shared by the content provider, but when the video source is being broadcast may become substantially modified.

Bookmarks are frame accurate pointers to a location within a video source. They are also relational to other bookmarks and carry some additional meta-data that can be utilized later by various other systems utilizing the bookmark at a later time. Unlike just a video fingerprint, consider a bookmark which is during a commercial and another bookmark during the same commercial later in the video source. Today's fingerprinting algorithms, designed to combat copyright infringement, would consider the video surrounding these bookmarks identical and the resulting fingerprint would be the same. Additionally by sharing the resulting video fingerprint from today's system there would be no way of knowing which one came first, the time between bookmarks or how to utilize them on a copy of the video source to regenerate a frame accurate pointer into the video with associated metadata.

The most public solution at this time is the YouTube video fingerprinting system. This system requires the original content owner to first allow the YouTube fingerprinting engine to scan all of their video assets. Then the engine scans all video files posted to the website for fingerprint matches to content owned by a content provider. The other most public solution is one being developed by Philips Electronics.

All of the current systems require all of the original video sources to be digested and are not designed to work with, for example, sporting events as these video sources vary dramatically from region to region. Essentially these systems rely heavily on the idea that the content owner has a copy of all of the versions of the content that have been distributed or provided to the public. Technology is making it possible for a content provider to syndicate their video content to multiple geographic locations while enabling each individual broadcaster of the content to tailor the final visible result based on their own liking. This means that there can be very large differences in timelines, as commercial times can vary and graphical overlays, as each broadcaster can have radically different methods of showing sports scores. Other issues break today's systems as each rebroadcast of a live feed can cause differences in the video source such as brightness, cropping, frames per second and bitrates. Today's systems expect the source fed into the fingerprinting engine be as close as possible to the source being shared publicly. Although there are some tolerances built in for contrast, brightness, bitrates and cropping, the range of accepted deviations for these data points is small as modifications to the sources are typical cutting out video from the larger video segment or transcoding the source, neither of which produce the differences which can be caused by local broadcasters modification, one or more hardware retransmissions and a wide variety of set top boxes all with highly varying video aspect ratios and digital to analog hardware components. An additional shortcoming of the other solutions is that they attempt to generate fingerprints for the entire video and as many fingerprints as possible for smaller sub-segments allowing their comparing systems to find copies of video even if the resulting copy is only a few seconds from a source that could be many hours long. To do this the systems are required to generate as many fingerprints as possible based on how the fingerprint engine is configured. Thus there is a tradeoff between having too many fingerprints and not being able to store them all versus the smallest segment time the content provider would like to detect.

There is a need for a system and method that goes beyond establishing copyright infringement occurrences.

SUMMARY OF THE PARTICULAR EMBODIMENTS

Systems and methods for replacing original media bookmarks of at least a portion of a digital media file with replacement bookmarks is described. A media fingerprint engine detects the location of the original fingerprints associated with the portion of the digital media file and a region analysis algorithm characterizes regions of media file spanning the location of the original bookmarks by data class types. The replacement bookmarks are associated with the data class types and are overwritten or otherwise are substituted for the original bookmarks. The replacement bookmarks then are subjected to a fingerprint matching algorithm that incorporates media timeline and media related metadata.

BRIEF DESCRIPTION OF THE DRAWINGS

Embodiments of the present invention are described in detail below with reference to the following drawings.

DETAILED DESCRIPTION OF THE PARTICULAR EMBODIMENTS

Figure 1:
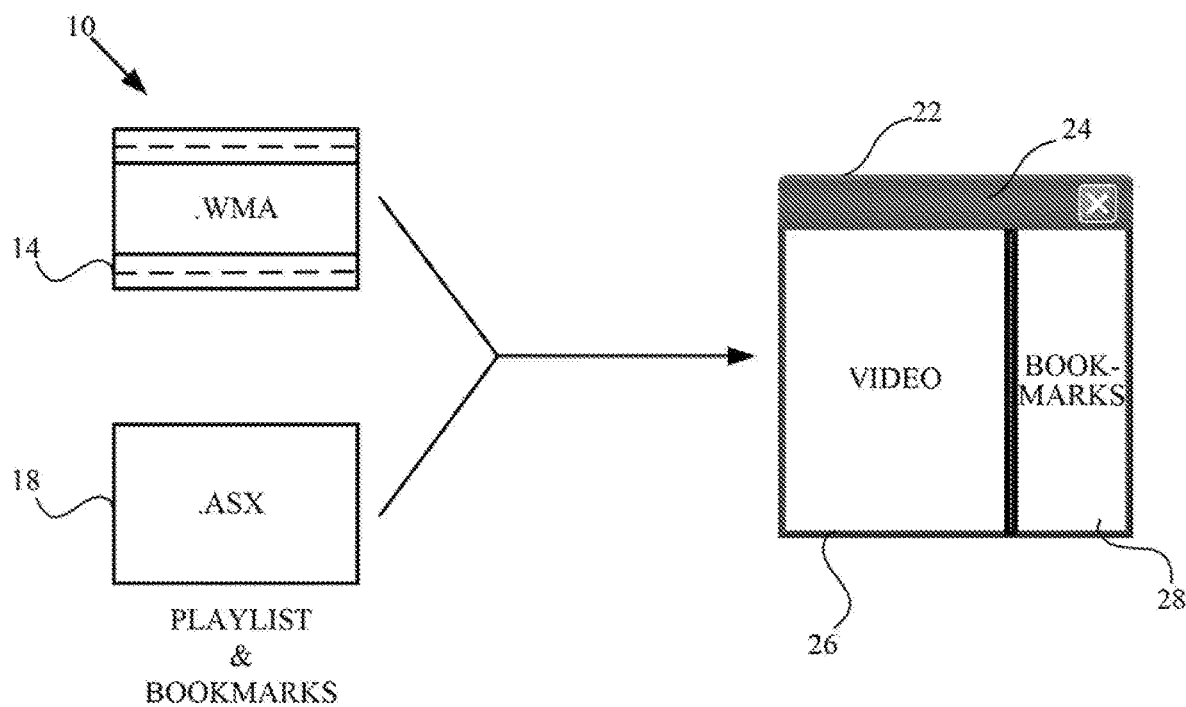
FIG. 1 schematically and pictographically depicts a flow process used by a content creator for presenting a bookmark listing adjacent to a video window within a computer executable media player.

Systems described below provide a method for replacing bookmarks in digital media files. The method for replacing bookmarks includes selecting a portion of a digital media file. The digital media file may be video, audio-video, audio, graphical, or alphanumerical data files. The portion of the media file may include a video frame group set, an audio segment, or an audio segment of an audio-video file. To the portion of the media file any original accompanying bookmarks are detected using a fingerprinting algorithm. Video sections or frame groups and/or any audio regions associated with the original bookmark are subjected to a region analysis algorithm to determine the presence of data set types or classes. A replacement bookmark is then applied to selected data sets having relevance to the replacement bookmark. The replacement bookmark then overwrites the original bookmark and is subsequently fingerprinted.

Moreover, the systems and methods described herein also provide for generating bookmark video fingerprints that strikes a balance between the burden of storing too many fingerprints and having too few fingerprints with an adequate segment time that the content provider would prefer for establishing content detection. The systems and methods comprise a fingerprinting engine, a video timeline, event metadata and a fingerprint-matching algorithm. Bookmarks are used to provide anchor points or media loci that are utilized by the fingerprinting engine with the video timeline component for automating a timeline of bookmarks that provide a relationship methodology between various anchor points. One example could be in which a bookmark A is found with close to a 100% confidence factor, and a bookmark D is also found with close to a 100% confidence factor. If the time between A and D is stored in the fingerprint of A and/or D, and the matched locations of these result in the exact amount of time between the bookmarks, the confidence factors increase or improve beyond just matching the fingerprint but also in matching the relativity of their respective locations. Additionally if the bookmarks between A and D, such as B and C are found with confidence factor matches substantially less than 100% but still substantial, say 70% for example, then by having A and D's timeline verified, the confidence of B and C increases substantially as the chances of A and D being a near perfect match and not having B and C also being a near perfect match is small. The confidence factors may be obtained using statistical based software products described below. Using the bookmarks as the starting point for generating the fingerprints, the fingerprint engine can ignore all other areas of the video to establish efficient fingerprint management.

Other systems and methods described herein provide for generating bookmark video fingerprints that strikes a balance between the burden of storing too many fingerprints and having too few fingerprints with an adequate segment time that the content provider would prefer for establishing content detection. The systems and methods comprise a fingerprinting engine, a video timeline, event metadata and a fingerprint-matching algorithm. Bookmarks are used to provide anchor points or media loci that are utilized by the fingerprinting engine with the video timeline component for automating a timeline of bookmarks that provide a relationship methodology between various anchor points. Using the bookmarks as the starting point for generating the fingerprints, the fingerprint engine can ignore all other areas of the video to establish efficient fingerprint management.

A particular embodiment includes a method for generating fingerprints for digital media files, and a method for detecting media file duplicates by examining the fingerprints of original source media files with the fingerprints of the media file being examined. The method includes sharing timeline and metadata of an original media file including at least one of an original digital media file. The original digital media file may include a video digital file and/or an audio digital file. Thereafter, a region within the original media file, for example a video region or an audio region, is identified. The method further includes book-marking the identified region within the original media file, either the video file or the audio file. Detecting includes ascertaining whether the bookmarked region is a duplicate of the original media file using the fingerprinting algorithm by comparing the original media file to the bookmarked region of the duplicate media file.

Alternate embodiments of the method include detecting a bookmarked region by selecting a frame group and/or audio segment of the original source, examining for the presence of matchable characteristics in the frame group or audio segment, applying a region algorithm to the frame group or audio segment to establish a loci of the matchable characteristic within regions of frames of the frame group or regions of the audio segment, removing repetitive occurrences of the matchable characteristics, and defining a path of the matchable characteristics within the frame group or audio segment. The defined path may be established by seeking the optimum vector pathway between matchable characteristics. The optimum vector pathway may be ascertained by matrix analysis of a 10×10 master blocks of video hashes or data set classes obtained from a minimum of 2 video frames to 10 or more video frames. By matchable characteristics it is meant that common features may repeat in different video frames, for example, and be matched as to location within a video frame relative to a preceding or subsequent frame so that a given characteristic or data type can be compared for its repetitive occurrence, or its diminished appearance or outright disappearance. Alternatively, matchable characteristics may also mean uncommon or dissimilar features possessed by any data type entity whose appearance in a video frame series may be tracked, for example the change in music types or change in non-musical sounds.

In yet other particular embodiment, disclosure below describes that defining a path of the matchable characteristics within the frame group or audio segment includes performing a matrix analysis of the data set classes for ascertaining a high confidence pathway. The matrix analysis may include ascertaining the high confidence pathway between similar data set classes, dissimilar data set classes, and a combination of similar and dissimilar data set classes.

In another particular embodiment a method for detecting and replacing original bookmarks accompanying media files with a new set of bookmarks or replacement bookmarks is described. The method allows substituting or overwriting media files having original bookmarks with bookmarks created by entities other than the media file owners. The media files may include video, audio-video, audio, graphic, and text files. The replacement bookmarks may be associated with fingerprints to allow a means to track duplication of the replacement bookmarks.

Other embodiments allow for a method to amend original bookmarks accompanying the media files or adding additional information to supplement the original bookmarks accompanying the media files. Digital media files received from alternate digital media suppliers are subjected to a fingerprint engine to ascertain duplication of bookmarks. The method includes sharing timeline and metadata of an original media file including at least one of an original media file. The original media file may include a video digital file and/or an audio digital file. Thereafter, a region within the original media file, for example a video region or an audio region, is identified. The method further includes book-marking the identified region within the original media file, either the video file or the audio file. Detecting includes ascertaining whether the bookmarked region is a duplicate of the original media file using the fingerprinting algorithm by comparing the original media file to the bookmarked region of the duplicate media file.

Another particular embodiment includes a system for generating fingerprints for media files, and a system for detecting media file duplicates by examining the fingerprints of original source media files with the fingerprints of the media file being examined. The system includes a means for sharing timeline and metadata of an original media file including at least one of an original media file. The original media file may include a video digital file and/or an audio digital file. Thereafter, a region within the original media file, for example a video region or an audio region, is identified. The method further includes bookmarking the identified region within the original media file, either the video file or the audio file. Detecting includes a means for ascertaining whether the bookmarked region is a duplicate of the original media file using the fingerprinting algorithm by comparing the original media file to the bookmarked region of the duplicate media file.

The described methods above also provide for a computerized method to detect bookmarks and ascertain the level of fingerprint matching between original source media files, duplicates or copies of media files compared with the original source media files, and/or bookmark detection and fingerprint matching between multiple copies of original source media files. Alternate embodiments of the computerized methods provide for generating fingerprints and replacing bookmarks in digital files. Other alternate embodiments of the computerized methods described above provide for computer readable media having instructions to perform computerized methods to detect bookmarks, ascertain the level of bookmark matching and/or fingerprint matching, and replacing bookmarks in digital files, and digital media files, including the video and audio portions of the digital media files. The computer readable media may include the computer executable instructions memorialized or stored in Compact Disk Read Only Memory (CD-ROM) media, Digital Video Disks (DVD) media, Flash memory media, and within magnetic based media located within internal and/or external hard drives operable by local and/or remote computer systems. The systems utilized by the methods described above and below may include standalone computer systems capable of connecting with a local network or a wide area network, including the Internet. The standalone computer systems may be online and in communication with other standalone computer systems, directly, or via a server, in any local or wide area network, including the Internet. Yet other embodiments for the computerized methods to detect bookmarks and ascertain the level of fingerprint matching between original source media files, duplicates or copies of media files compared with the original source media files may be conveyed electronically from one computer system to another computer system, including directly from the described computer readable media to remote computers on a local or wide area network, including the Internet.

These system and methods described above and below extend beyond enforcing copyright protection, but advantageously provide for the sharing of bookmarks, timelines and metadata that, in any combination, may all be embedded into an array of sharable fingerprints. Unlike strict video fingerprinting, these systems and methods described below can find the same bookmarks within the same or dramatically different versions of the original video, thereby achieving the balance between the burden of storing too many fingerprints and having too few fingerprints with an adequate segment times.

Alternate embodiments of the systems and methods described herein provide for those circumstances in which large modifications to the original broadcast content is made and subsequently re-broadcast in whole or in part. Such modifications which cause today's fingerprint methods to fail are graphic and text overlays, such as during a sporting event each local channel may overlay their own graphics for the score and game time, localized banners above or below the content and set top box differences such as brightness, contrast and video ratio. Additionally each fingerprint in today's methods stand alone, and as such they do not utilize a relationship to a timeline or specific metadata about the event as described by the systems and methods herein for the detection and/or utilization of facilitating detection of frame accurate bookmarks.

Furthermore the fingerprint is used only to detect if video is found to be copied but do not facilitate detection of frame accurate bookmarks. For copyright issues these additional data sources are not useful as the goal is to simply detect if the copy being reviewed is from a source that has a similar enough fingerprint to be considered the same material.

The particular embodiments include systems and/or methods to generate video fingerprints, a timeline and metadata which can be shared with another system to find the same bookmark locations within an identical or highly changed version of the same broadcast event and, more particularly, to enabling these bookmarks to trigger events between clients such as allowing a client to mark two points within a broadcast and share these with another client which has access to the same broadcast which may have different quality, brightness, cropping, audio, broadcast times, commercials and overall timeline modifications. Additionally disclosure herein relates to how to generate such video fingerprints which utilize event metadata, timeline relationships and a unique fingerprinting algorithm to ensure bookmarks can be found regardless of typical broadcast modifications between geographic regions, distribution systems and other broadcast differences even though the main broadcast content is of the same event.

In accordance with the particular and alternate embodiments, there is provided a fingerprinting engine, a video timeline, event metadata and a fingerprint-matching algorithm. Unlike other fingerprinting and matching algorithms, this invention assumes that fingerprints are generated only around bookmarks that have been placed manually or via an automated system into the source video. These bookmarks are used as anchor points which are then utilized by the fingerprinting engine as well as the video timeline component for automating a timeline of bookmarks which provide a relationship methodology between various anchor points. By utilizing bookmarks as the starting point for generating fingerprints, the engine can ignore all other areas of the video, as this system is not intended, unlike with other fingerprinting methods, for copyright protection, but for sharing of fingerprints, timelines and metadata with another user and utilizing these to find the same bookmarks within the same or dramatically different version of the video broadcast/event. Rather than generating hashes of the entire file or subsets of the file across the entire file, this system generates multiple hashes utilizing an algorithm that varies the number of frames before and after the bookmark as well as combinations of sub-blocks of the source video.

The fingerprinting engine is configured to review N number of segments that are generated by taking X number of frames prior to and Y number of frames after a bookmark. Where N can be any number larger than one and the values of X and Y can be fixed or automatically generated based on another algorithm. For each frame of each segment, the frame itself is segmented into Z number of regions, each region could be of any shape and they can overlap. The shapes can be guessed based on algorithms which utilize sources such as historical statistical data or fixed such as 20×20 squares used in a matrix analysis covering the entire frame. It is possible to provide M number of region generation algorithms to the fingerprint engine at the same time. Then, each segment is analyzed for both motion between frames and static data such as Object Character Recognition (OCR) and Object Graphic Recognition (OGC). Then each region for each frame is given a set of values that represent a hash of the scale and vector of motion, general image characteristics, OCR and OGC components. The fingerprint engine now has, for each frame within the N number of segments, Z times M number of regions. Additionally it knows the original time stamp of the bookmark, which is being used as the anchor point for the generated segments, as well as the timeline relationship of this bookmark to other bookmarks in the same broadcast. Combinations of paths from the first frame to the last frame are generated based on a filtering system that reduces points on each path that are considered redundant or highly similar. This step is designed to remove dependencies on such things as frames per second or regions of the video that are not updated often. After this, a geographic pathway algorithm is used to analyze these paths that are essentially filtered combinations of regions hash values, and sort them based on best to worst path.

In general, the system and methods provide for generating video fingerprints tied to timelines to generate accurate bookmarks within a broadcast for making it possible to share the fingerprints, timeline and event meta data with another client such that the same bookmarks can be accurately found within a different video source of the same event from which they were originally generated from. The systems and methods comprise an event metadata, for passing data associated with the video such as broadcast time and title. For sporting events it can be teams playing, location and game id; a source video, for providing the source frames to the fingerprint engine; a video timeline, for providing the fingerprint engine information about where the bookmark is located relative to other bookmarks and other known attributes of the source video such as event start times and commercial breaks; a bookmark, for use as a starting point for generating the segments specific to this location in the source video and are also frame accurate pointers into the video; a segment, for grouping a set of frames relative to a bookmark position; a frame, for enabling the region algorithms to utilize individual frames from within a segment as individual digital images; a region algorithm, to utilize information from a single frame or multiple frames to break each frame down into discrete regions. One region algorithm, for example, could be a motion detection algorithm which would generate regions specific to movement between frames. A simple region algorithm could also be simply breaking the frame into smaller 10×10 pixel squares; a region, for representing a single region from within a frame as generated by a region algorithm; a fingerprint engine, for converting regions into binary representations, such as a hash code, and to generate paths from one region in one frame to another such that a path spans all available frames; a path filtering, for removing redundancies and low threshold elements of a path such that the resulting path represents a near frame rate independent fingerprint unique to the frames which were processed; a path sorting, for sorting the paths from strongest fingerprint to weakest, where the strongest represents a path which when matched results in the highest confidence level the two fingerprints are from the same video bookmark; a fingerprint matching, for determining if there is a match from an incoming fingerprint against a known set of fingerprints; and an alternative video, for representing an alternative path array which was generated utilizing fingerprints, path filtering and path sorting. A codec may be used to take full frames from a video source and reduce them as much as possible to rasterized and/or a vector based information that advantageously provides providing sizable compression to data files. The codecs provide the ability to encode and decode data files. That is, the codecs may encode a data stream or signal for transmission, storage or encryption, and/or decode it for viewing or editing. The codecs are often used in videoconferencing and streaming media applications. By recognizing patterns in the source frames, the data within the source frames can be represented digitally in a substantially reduced byte-containing file. In a way we are repeating this process, by taking the video frames and performing some similar functions as would a compression algorithm, such as the lossless Moving Pictures Expert Group-4 (MPEG4) codec, both the frame data and the data generated by available compression algorithms may be utilized. In an alternate embodiment, other non-compression style algorithms may be employed in those circumstances that do not require high resolution video information, but only requires the information that is sufficient to ascertain whether a fingerprint match exists between any two or more media files (for example, an original vs. a copy, and/or a copy vs. another copy), either the video portion of the media file, and/or the audio portion of the media file.

FIG. 1 schematically and pictographically depicts a flow process 10 used by a content creator for presenting a bookmark listing 28 adjacent to a video window 26 within a computer executable media player 22, for example a Windows Media Player skin 22. A video file in a Windows Media Video WMV 14 format is merged with an Advanced Stream Redirector or .ASX file 18, having for example, a playlist and bookmarks. The .ASX file 18 is generally used by servers to store information and media files for streaming video and audio content over the Internet. Content creators of audio video files, for example, utilize the WMV file 14 and .ASX files 18 to merge into a two-panel Widows Media Player skin 22 having a closing and re-sizing bar 24 above a video panel 26 adjacent to a bookmarks panel 28. The content creator or publisher manufactures or otherwise has control over the production of the two-panel screen shot 22 with publisher selected or created audio-video panel 26 with publisher-created or publisher-selected bookmarks panel 28. The audio video content and the bookmark content appearing within the respective video panel and bookmarks panels 26 and 28 of the media player skin 22 are controlled by the content creators or publishers.

Figure 2:
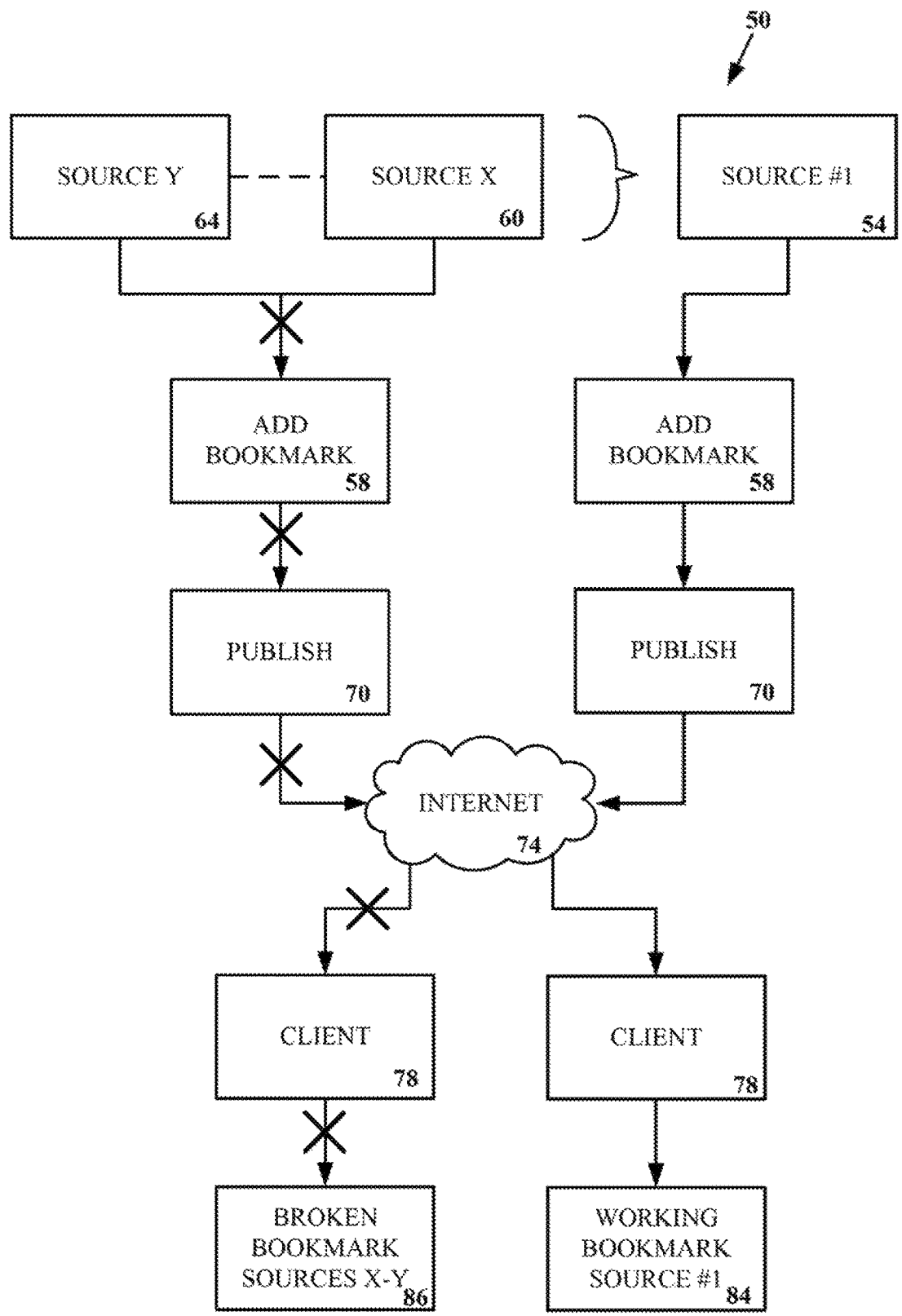
FIG. 2 schematically depicts a system utilized by a content creator to prepare the video and bookmark listing presentable within the computer executable media player.

FIG. 2 schematically depicts a system 50 utilized by the content creator or publisher to prepare the video and bookmark listing presentable within the computer executable media player skin 22. The system 50 includes audio video content obtained from a first source 54 to which bookmarks 58 are merged for presentation or publication 70 in the player skin 22 as pictographically illustrated in FIG. 1, that is then uploaded to the Internet 70. Thereafter, computer users or clients 78 downloads the content creator pre-made video and pre-made bookmarks for presentation on the client's 78 computers as computer executable Widows Media Player skin 22. The skin 22 is observable in YouTube postings, TiVo recordings, Sling Box recordings. Thus video highlight reels of a sporting event or historical event can only be bookmarked by the publisher or content creator.

Also shown in FIG. 2 is an unproductive arm that prevents independent third party bookmark creators to merge with publisher-provided and/or controlled audio video files. Here alternate video source suppliers 60 and 64 who independently manufacture bookmarks X 60 and Y 64 are blocked from the merging process pictographically depicted in FIG. 1. Accordingly, the user client 68 cannot receive the bookmark contents from independent alternate video source suppliers and third party bookmark manufactures 60 and 64. Thus bookmark information or commentaries from third party bookmark makers that might be available in mashups and other files are unavailable for consumption or downloading through the Internet 74.

Figure 3:
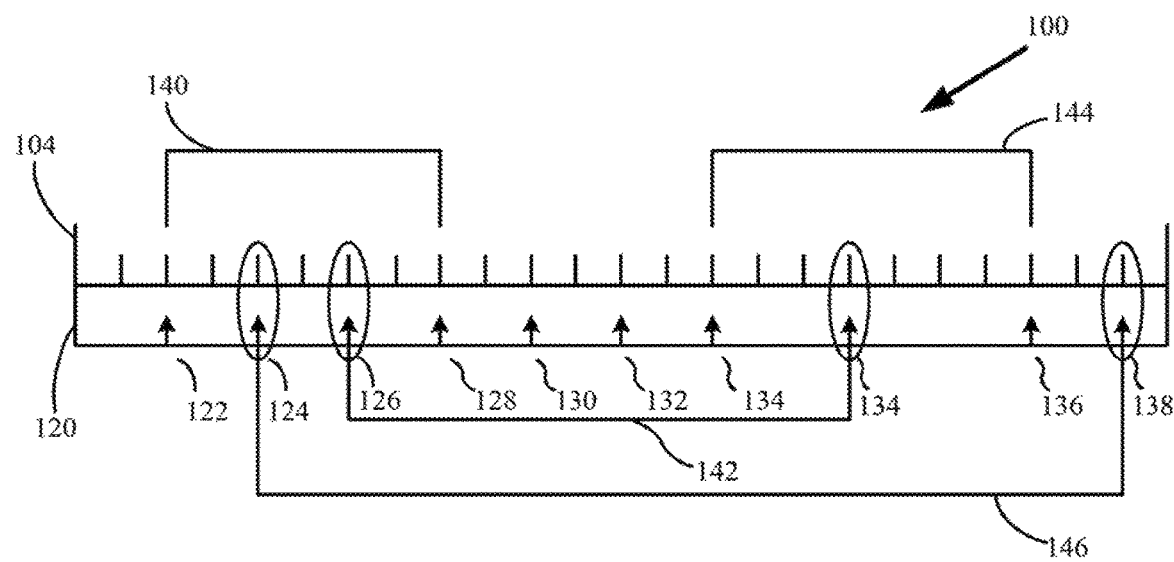
FIG. 3 schematically depicts bookmarks along a segment of video frames.

FIG. 3 schematically depicts bookmarks along a segment 100 of video frames depicted as tick marks of a horizontal time axis 104. Representative periods depicted in this exemplary segment 100 ranges from approximately 3 to 15 seconds. Bookmark begin and end locations representing the time segments for insertion of information containing bookmarks having content related to a group of video frames is designated by arrows 122-136. Audio-video frame groups 140, 142, 144, and 146 are respectively defined by begin and end book-mark segments 122-128, 126-134, 130-136, and 124-138 available to third party or independent bookmark generators for placing information content related to the video frame groups 140-146.

Figure 4:
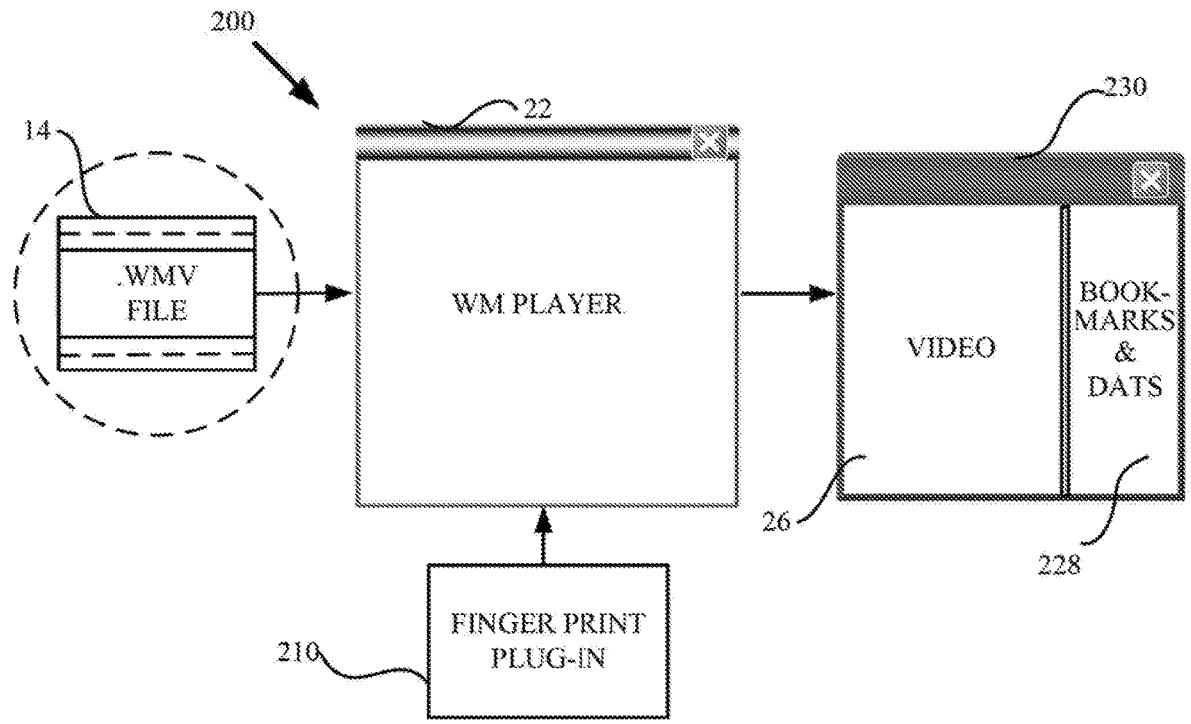
FIG. 4 schematically depicts a system utilized by a third party to present a third party created bookmark listing adjacent to the content creator video and presentable within the computer executable media player.

FIG. 4 schematically and pictographically depicts a flow process 200 utilized by a third party to present a third party-created bookmark listing adjacent to the content creator video and presentable within the computer executable media player. By third party is meant independent bookmark creators operating independently from the publishers, owners or groups authorized by publishers and owners to generate bookmarks to audio-video content owned by the publishers or owners. The system 200 includes the video WMV file 14 that can be incorporated into the video panel 26 of the two-panel Windows Media Player skin 22. In this flow process the Windows Media Video WMV 14 utilizes a Windows Media Video player fingerprint plug-in 210 that allows independent bookmark creators to merge information content bookmarks segments similar to bookmark segments 122-128, 126-134, 130-136, and 124-138 illustrated in FIG. 3 for audio-video frame groups 140, 142, 144, and 146. The fingerprint plug-in 210 allows the independent bookmark creators to create bookmark content separate from the audio-video content owners or publishers and present it in a bookmark panel 228 adjacent to the audio-video panel 24 appearing in a two-panel Windows Media Player skin 230. The fingerprint plug-in 210 allows independent bookmark creators to place interactable bookmarks and/or data in the bookmark panel 228 for any media file, audio, audio-video, and video presenting in the video frame 26.

Figure 5:
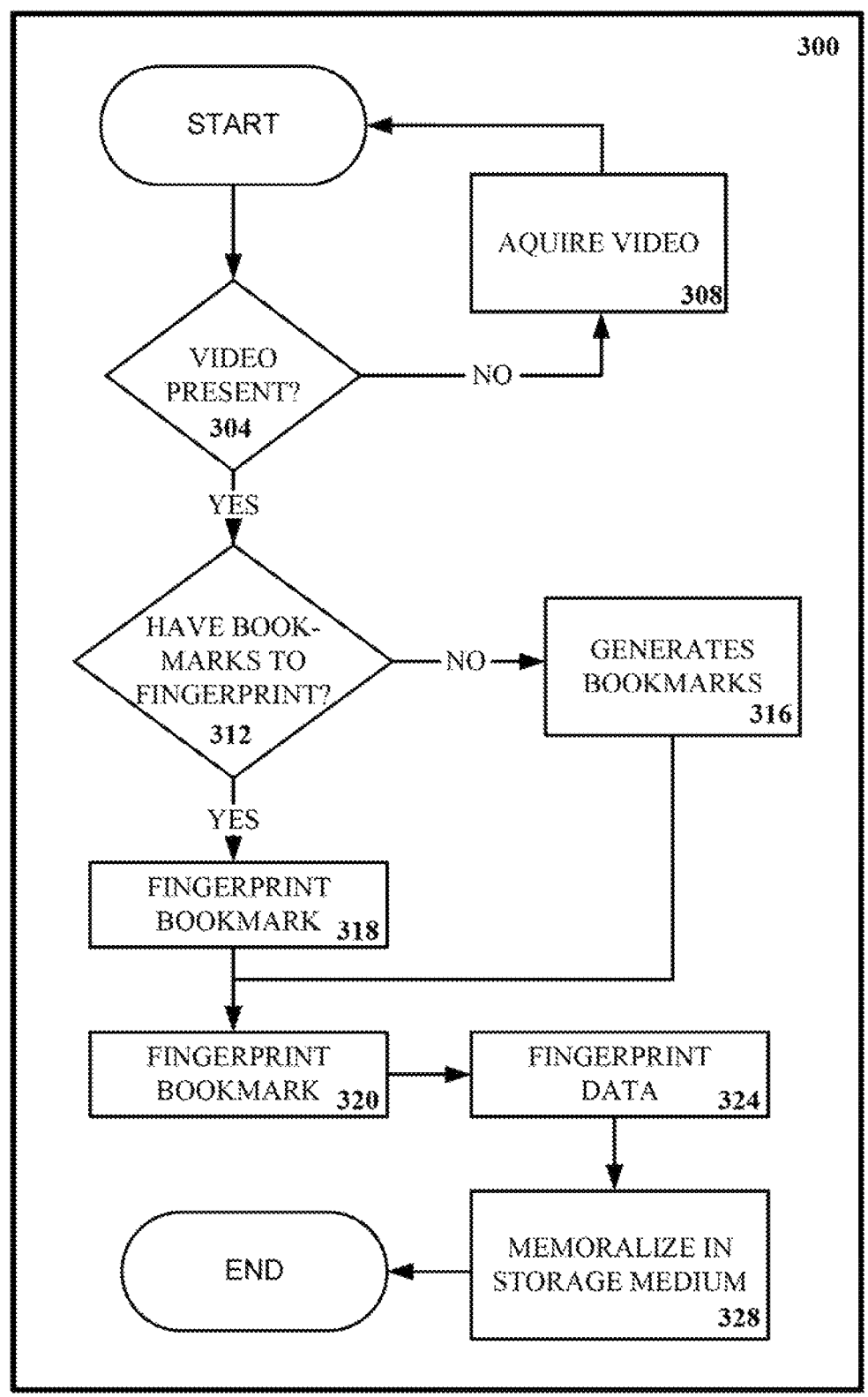
FIG. 5 schematically illustrates a bookmark producing algorithm 300 utilized by a third party to place a bookmark list adjacent to a content creator video presentable within the computer executable media player.

FIG. 5 schematically illustrates a bookmark producing-and-fingerprinting algorithm 300 utilized by a third party or independent bookmark creator to place an interactable and/or data containing bookmark list adjacent to the content creator video presentable within the computer executable media player 22. Bookmark producing-and-fingerprinting algorithm 300 begins with decision diamond 304 for securing an answer to the query "Video present?" If negative then video, or audio, or audio video files are acquired at process block 308 and generation algorithm returns to decision diamond 304. If affirmative, generation algorithm routes to decision diamond 312 seeking an answer to the query "Have bookmarks to fingerprint?" If negative, bookmarks are created or generated at process block 316. If affirmative, previously generated bookmarks are retrieved from storage at process block 318. Newly generated or retrieved bookmarks are then routed to process block 320 for bookmark fingerprinting to ascertain whether unauthorized duplication occurs when examining original content sources from other sources. Thereafter, at process block 324, fingerprint data is inserted or associated with the newly created or retrieved bookmark. The bookmark producing-and-fingerprinting algorithm 300 then is completed at process block 328 in which the created and fingerprinted bookmark is memorialized in a storage medium. The storage medium to store the fingerprinted bookmarks may include magnetic, optical, hard disc, DVD, CD, or flash memory devices.

Figure 6:
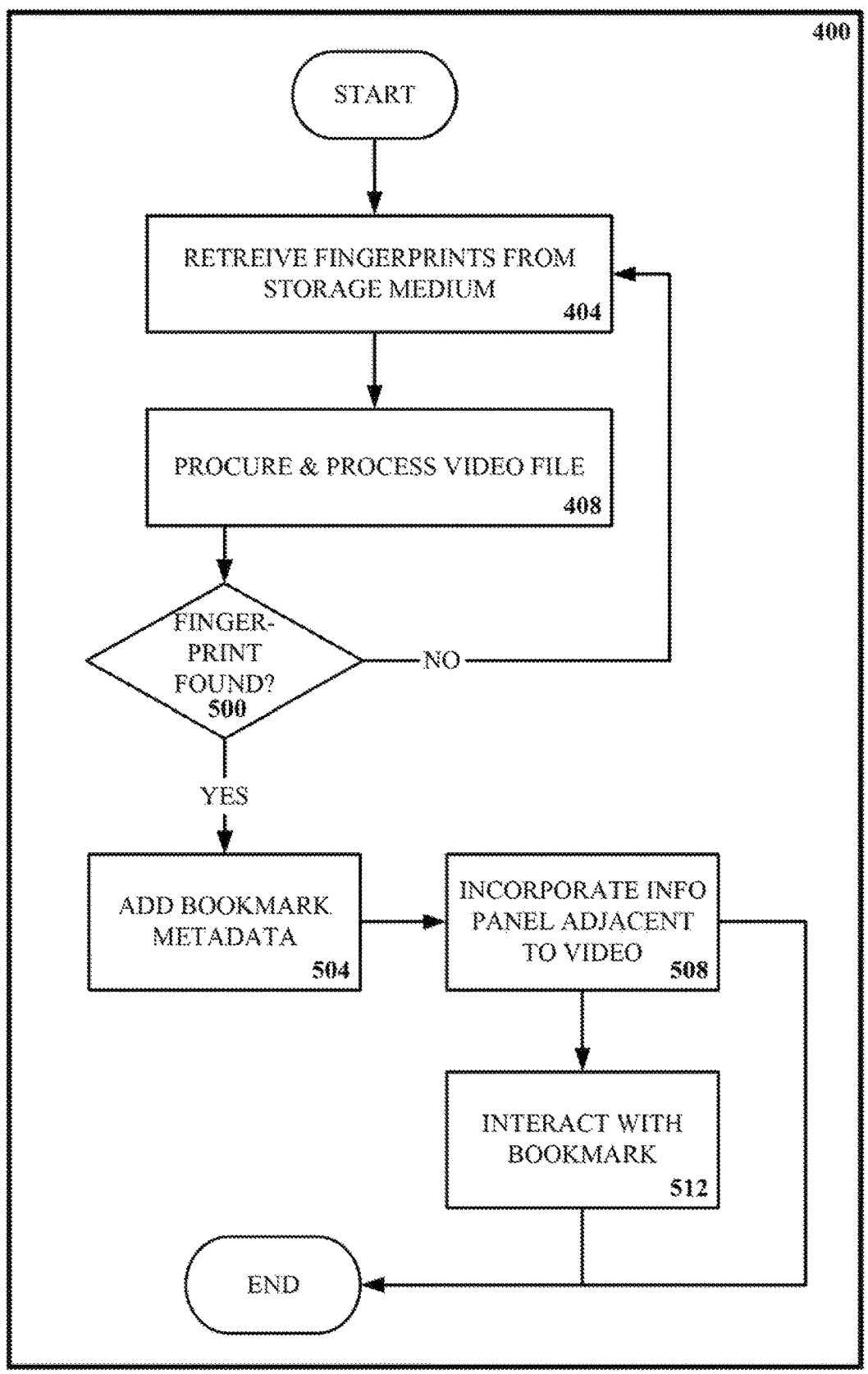
FIG. 6 schematically illustrates an algorithm to retrieve, incorporate, and utilize bookmarks listed in an adjacent panel to the content creator video presentable within the computer executable media player.

FIG. 6 schematically illustrates a fingerprinting usage algorithm 400 to retrieve, incorporate, and utilize bookmarks listed in an adjacent panel to the content creator video presentable within the computer executable media player. Fingerprinting usage algorithm 400 begins with retrieving fingerprints from storage medium at process block 404, then continues with procuring and processing video file at process block 408. Procuring and processing is not limited to video files, but may include any media file having audio and audio-visual content. Thereafter, at decision diamond 500, an answer is sought to the query "Fingerprint found?" If negative, algorithm 400 re-routes to process block 404. If affirmative, algorithm 400 continues to process block 504 where bookmarks and/or metadata is added. Thereafter, at process block 508, bookmarks are incorporated into the bookmark panel 228 adjacent to video panel 24 of Windows Media Player skin 230. If usage interaction is passive, for example reading by the user, fingerprinting usage algorithm 400 is completed. If usage is active, the fingerprinting usage algorithm 400 continues and is completed at process block 512, interact with bookmark. Here the user may left-click, right-click, or otherwise signal some form of active interaction to the listed bookmark text or link presented in the bookmark panel 228 using a computer interaction device or touch screen.

Figure 7:
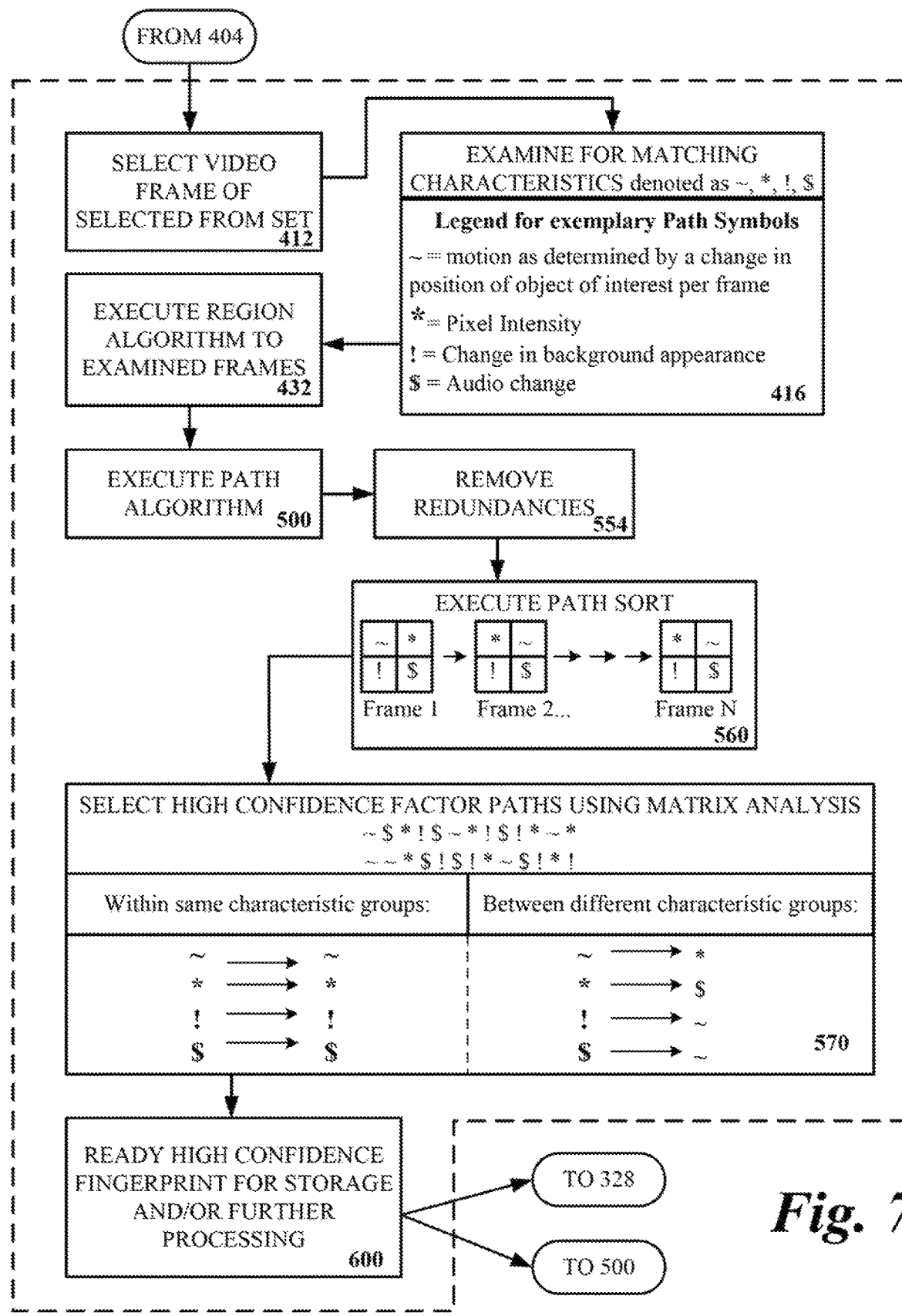
FIG. 7 schematically illustrates an expansion of the Procure and Process sub-algorithm 408 of FIG. 6.

FIG. 7 schematically illustrates an expansion of the Procure and Process sub-algorithm 408 of FIG. 6. In general the algorithm 408 describes a method for detecting a bookmarked region by selecting a frame group and/or audio segment of the original media source, examining for the presence of matchable characteristics in the frame group or audio segment, applying a region algorithm to the frame group or audio segment to establish a loci of the matchable characteristic within regions of frames of the frame group or regions of the audio segment, removing repetitive occurrences of the matchable characteristics, and defining an accurate path of the matchable characteristics within the frame group or audio segment.

Entering from process block 404, defined video frame groups, and or audio, or audio-visual segments or frame groups, are selected for bookmarking at process block 412. Thereafter, at process block 416, matching characteristics within the defined video frame groups and/or audio segments are sought or examined for. Matching characteristics may include music genre, sounds other than music, colored regions of video files, pixel intensity of video frames, background regions, foreground regions, objects indicating motion, etc. Once matching characteristics are defined, Procure and Process sub-algorithm 408 continues with executing region algorithm 432 explained in FIG. 9 below. In general, the region algorithm 432 includes identifying subsets of a video frame and examining for a consistent characteristic or appearance that repeats in some manner, or changes gradually, and/or terminates suddenly or changes quickly that is indicative of subject matter occurring within, for example, the audio-video frame groups 140, 142, 144, and 146 to which bookmarks pertain. This could be the path undertaken between frames of a basketball, baseball, or soccer ball, a dancer's movement, a football player's movement, a car chase scene, or something indicating human-to-human interaction, for example a romance scene. In music audio files, the repeating characteristics could be a beat, a stanza, or other audio quality that can be defined and tracked. The sound increases signaling the start of a commercial or the pixel darkening indicating that a commercial is imminent or other examples used by the region algorithm 432 to access the relevant audio-video frame groups to associate with a bookmark. Thereafter, the Procure and Process sub-algorithm 408 continues with executing a Path algorithm at process block 500, followed by reducing redundancies at process block 554 that filters out or removes repetitive regions. That is the path filtering or redundancy removal algorithm 554 attempts to reduce redundancies and elements of a path where previous or next elements on the same path represent redundant information. Then, at process block 560, a Path-Sort algorithm is launched at process block 560. The Path-Sort algorithm Path sorts path and ranks in each of the paths in order from strongest path to worst, where the strongest path represents a path which when matched provides the highest confidence that the other path being matched were generated from the same bookmark 18 of the content owner generated WMV 14 file location to those bookmarks presented for alternative videos received from alternate sources 60 and 64. Once a set of paths is sorted or selected to follow a discernable or definable characteristic in video or audio segments, a high confidence path is selected at process block 570 utilizing confidence factors determined from a matrix analysis of data types ~, !, $, and * described in FIG. 8 below. The algorithms described here utilized to obtain confidence factors for each fingerprint match between the media file sources, either the video portion and/or the audio portion, may be obtained from analysis of different fingerprint data using statistical software products, for example, SAS, obtained from the SAS Institute, Cary, NC, USA. Thereafter, at process block 580, the high confidence fingerprints are readied for storage and/or further processing. This completes the Procure and Process sub-algorithm 408 and exits to decision diamond 500 of FIG. 6 or process block 320 of FIG. 5.

Figure 8:
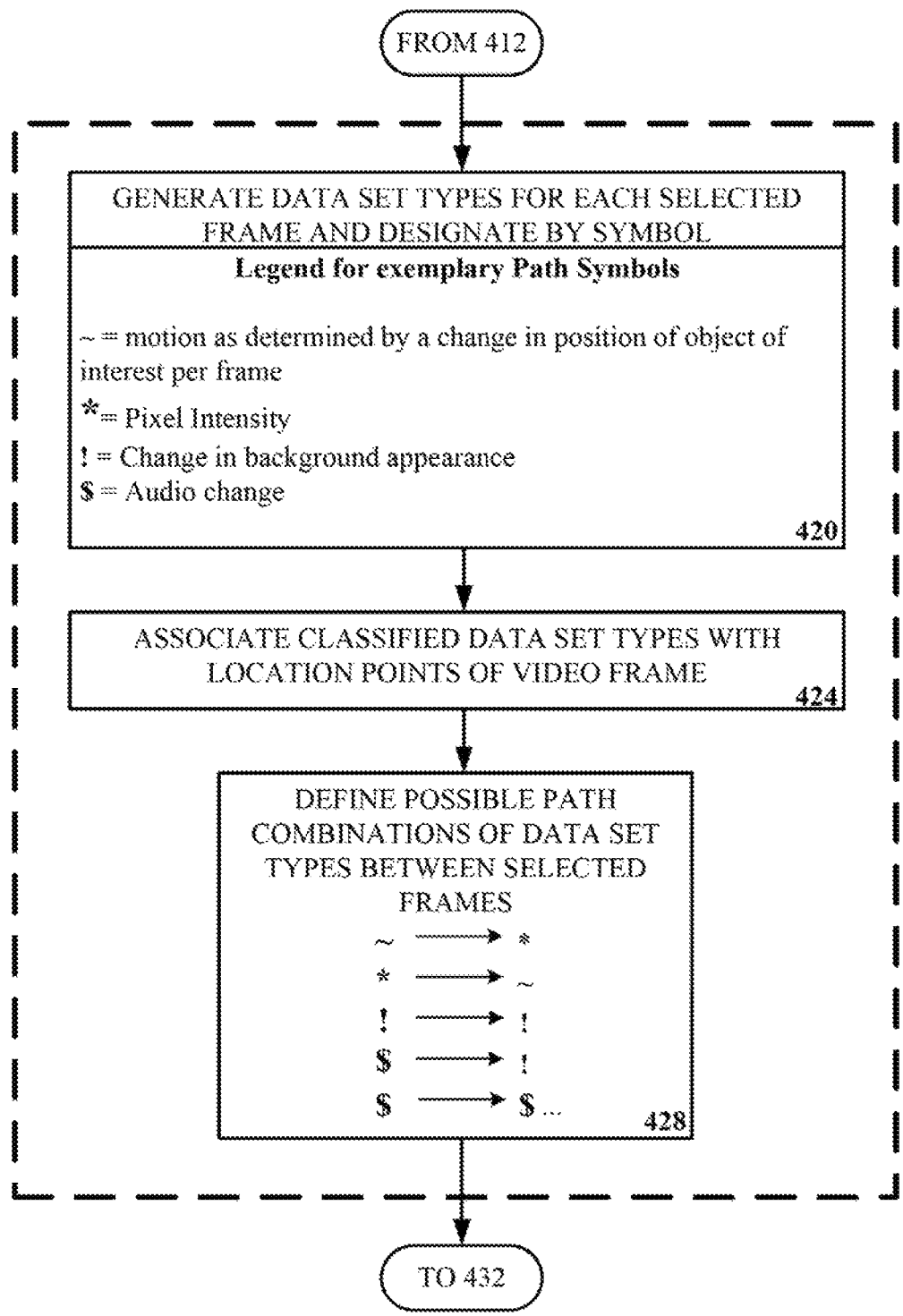
FIG. 8 schematically illustrates an expansion of the Examine for Matching Characteristics sub-algorithm 416 of FIG. 7.

FIG. 8 schematically illustrates an expansion of the Examine for Matching Characteristics sub-algorithm 416 of FIG. 7. In general the sub-algorithm 416 describes a method to examine for matchable characteristics by generating data-set types for regions within each frame of a frame group or audio segment, associated the data set type classes with location points of the video frame or audio segment, and ascertaining possible pathways between data set types between loci of adjacent frames or audio segment regions.

Entering from process block 412, designated data sets of the video and/or audio frame sets or groups are characterized to types and denoted with symbols shown in Generate Data Types algorithm of process block 420. The Generate Data Types algorithm can utilize, for example, motion detection, alpha channel luminescence or optical character recognition (OCR) to identify or discern within a given frame into different regions and/or groups of data points. For example "~" may designate motion as determined by change in position of an object of interest per frame, "*" designate changes in pixel intensity, "!" may designate changes in video background or foreground appearances, and "$" may designate changes in characteristic music themes or non-musical sounds. An example of the change in characteristic music themes would be when a rock-and-role music theme is gradually or abruptly replaced with a classic opera music theme. An example of a change in non-musical sounds would be the roar of a jet engine being replaced with sounds associated with squawking birds of a jungle. Thereafter, at process block 424, the classified data sets are associated with location points within a video frame or audio region. Then, at process block 428, possible path combinations are defined by examining the changes with a particular or common characteristic between video frames or audio segments. For example, paths may be generated from each ~, !, *, and $ region to form a chain of regions between similar or dissimilar data types between video frames. That is, a chain of similar or dissimilar regions can be defined as a path having a vector between data set classes. For example, path "$ to $", path "~ to ~", path "! to !", and path "* to *". Conversely, possible path combinations may occur between different data types. For example, path "$ to *", path "~ to !", path "! to $", and path "* to ~". Upon selecting the possible path combinations, Examine for Matching Characteristics sub-algorithm 416 exits to process block 432.

Figure 9:
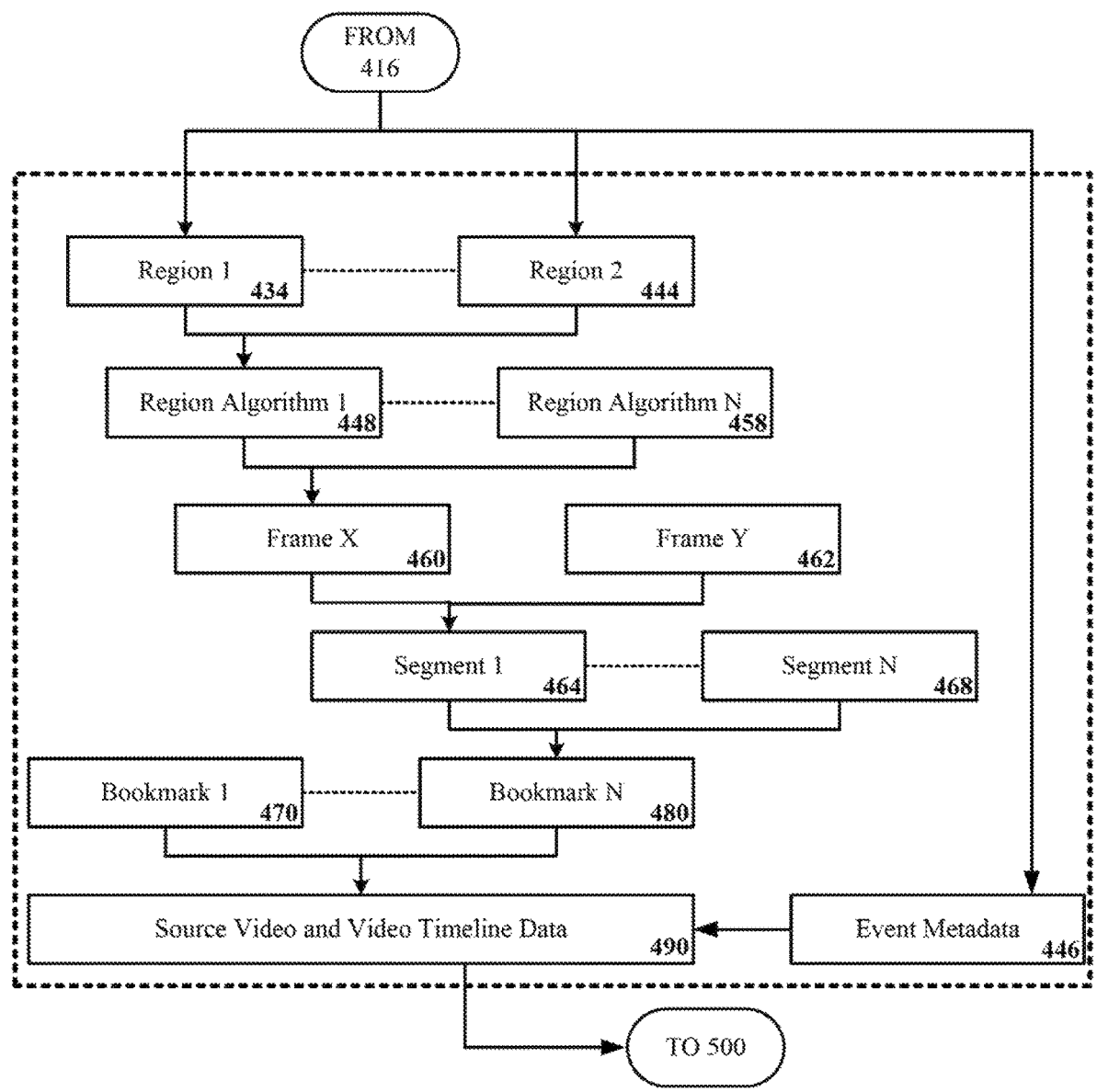
FIG. 9 schematically illustrates an expansion of the Execute Region Algorithm of sub-algorithm 432 of FIG. 8.

FIG. 9 schematically illustrates an expansion of the Execute Region Algorithm 432 of sub-algorithm 416 of FIG. 8. The Execute Region Algorithm 432 allows the determination of an original bookmark location among an array of fingerprinting paths. Algorithm 432 in flowchart form depicts an element diagram that shows how source video is broken down into an array of fingerprint paths for each bookmark and how these can be compared to an alternative video source to determine of the original bookmark location is found within the alternative source. Entering from process block 416, Execute Region Algorithm 432 begins with examining regions of a video frame, here depicted as Region 1 process block 414 and Region 2 process block 444, and any metadata accompanying original file WMV 14 are reserved in process block 446. The regions examined need not be limited to two regions, but as many regions of interest present in a given video frame or audio region. The source video in the form of the audio-video frame groups 140, 142, 144, and 146 to which bookmark segments 122-128, 126-134, 130-136, and 124-138 illustrated in FIG. 3 potentially pertain are broken down into an array of fingerprint paths for each bookmark segment and how these can be compared to an alternative video sources 60 and 64 to determine whether the original bookmark 18 created by the content creators of WMV file 14 as illustrated in FIG. 1 is found within the alternative video sources 60 and 64. Region algorithms in process blocks 448 and 458 are applied to the video or audio portions of each frame in frame groups 140, 142, 144, and 146 to determine, for example, the occurrence of character types ~, *, ! and $ from the first frame X of block 460 to the last Frame Y of block 462 of a segment 1 in block 464. This process block 424 through block 462 is iterative for all the frames of from segment 1 through segment N of block 468, as for example, all the frames contained in the respective frame groups 140, 142, 144, and 146. The occurrence of character types ~, *, ! and $ are then associated with bookmark 1 of process block 420 to bookmark N of process block 480. Bookmarks 1 through N are then associated with event metadata from block 446 with the source video and timeline data in process block 490. The Execute Region Algorithm 432 is then completed and exits to process block 500.

Figure 10:
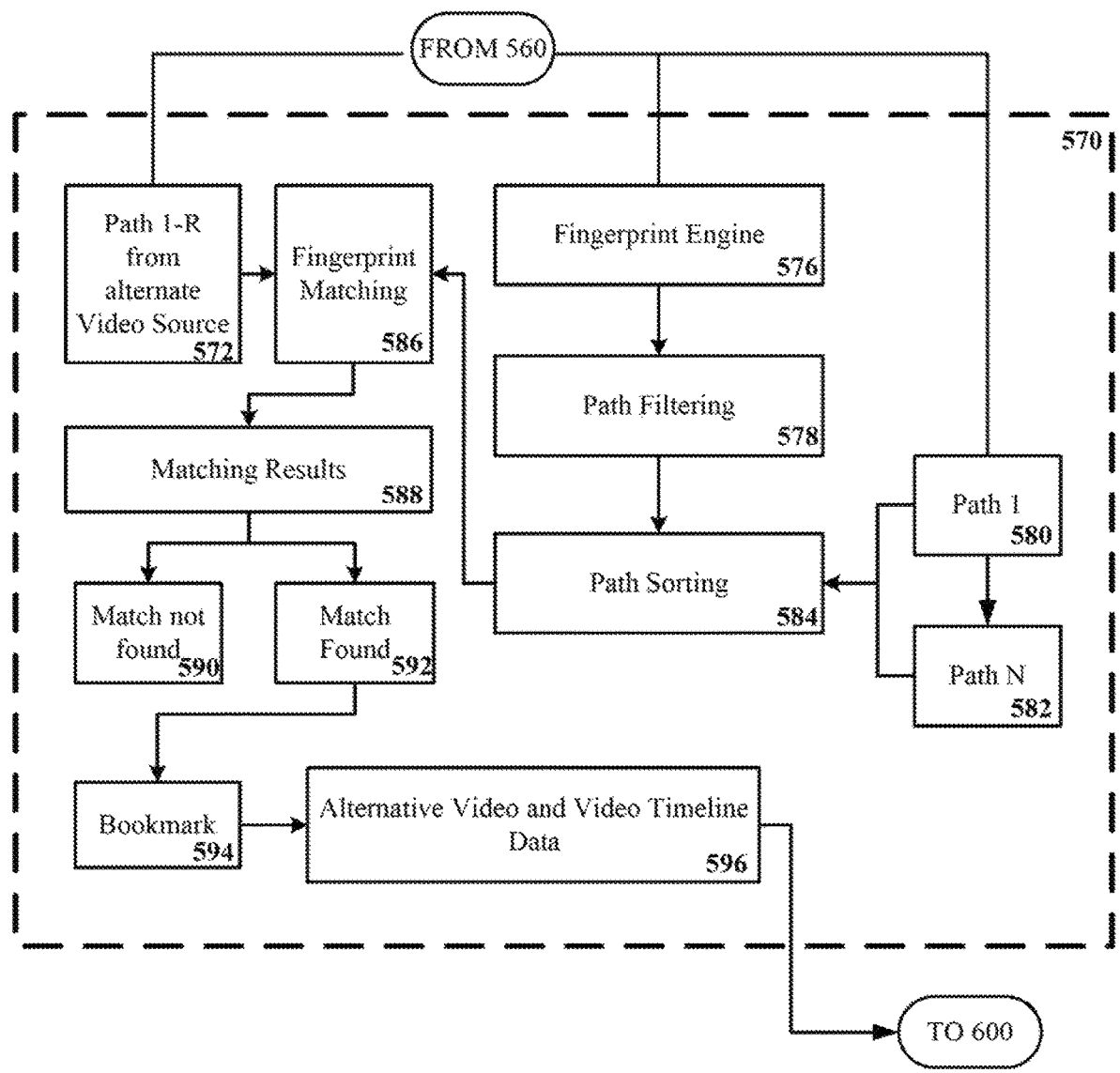
FIG. 10 schematically illustrates an expansion of the Select High Confidence Factor Paths algorithm 570.

FIG. 10 schematically illustrates an expansion of the Select High Confidence Factor Paths algorithm 570 directed to ascertaining high confidence pathways and high confidence fingerprint matching of video and/or audio files from alternate video sources 60 and 64. The high confidence pathway may between similar matchable characteristics or data set classes, dissimilar, or a combination of similar and dissimilar data set classes.

Entering from process block 560, algorithm 570 begins with determining a Path 1-R from alternate video sources 60 and/or 64, a fingerprint engine 576, and a primary path or Path-1 at process block 580. The fingerprint engine 576 can utilize any metadata information retrieved from the metadata block 446 depicted in FIG. 9 and associate the metadata information with the character data types ~, !, *, $ or other character data types. The Path 1-R from alternate video sources 60 and/or 64 are subjected to a fingerprint matching algorithm at block 586. The fingerprint matching algorithm 586 utilizes the set of known paths as well as other data such as event metadata obtained from event metadata 446, to determine that separate, third-party or independently created bookmarks similar to the bookmark segments 122-128, 126-134, 130-136, and 124-138 depicted in FIG. 3 through which are added or associated via the Fingerprint plug-in 210 of FIG. 4 with the WMV file 14 or other WMV files received from alternate sources 60 and 64 are so associated with a high confidence level threshold to acquire the relevancy of the content owner created bookmarks in the ASX file 18 depicted in FIG. 1. The fingerprint engine 576 can utilize any information from event metadata 446 through to specific regions of the video frames or audio segments and fingerprint each bookmark associated with the video frame groups or segments. After fingerprinting the bookmark segments, algorithm 570 continues to process block 578 to remove redundant paths and then selection for an optimal path at Path Sorting block 584. Thereafter, fingerprints are examined for matching characteristics in Fingerprint Matching block 586, and matching results are evaluated at process block 588. If match is not found, Algorithm 570 is stopped for that sorted pathway at process block 590. If a high accuracy match is found at process block 592 for the selected and sorted pathway, the bookmark is applied at process block 594 to those segments of Alternate Video and Video Timeline Data at block 596.

While the particular embodiments have been illustrated and described for acquiring efficient bookmark listings to live and/or archived footages of video, audio, and other data files, other embodiments may include that bookmark production may be distributed among a series of remote clients or user operated workstations that coalesce into a single bookmark listing located in a panel adjacent to a content creator data, audio, or video file presentable within a computer executable media player. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for generating video fingerprints comprising:
   sharing timeline and metadata of an original digital media file including at least one of a video digital file or an audio digital file;
   identifying a region within the original media file, wherein identifying a region of the original digital media file includes determining data types within the digital media file, wherein determining data types includes at least one of a pixel luminescence value, a region of pixel luminescence values, an indicator of object motion, a change in sound volume, or a change in sound types;
   bookmarking the identified region with a fingerprinting algorithm;
   detecting a bookmarked region of a duplicate of the original media file using the fingerprinting algorithm, wherein detecting a bookmarked region includes selecting a frame group, examining for the presence of matchable characteristics in the frame group, applying a region algorithm to the frame group, removing repetitive occurrences of the matchable characteristics, and defining a path of the matchable characteristics within the frame group; and
   comparing the bookmarked region of the original media file to the bookmarked region of the duplicate.

2. The method of claim 1, wherein examining for the presence of matchable characteristics in the frame group includes generating data set type classes for regions within each frame of the frame group, associating the data set type classes with location points of the video frame, and ascertaining possible pathways between data set type classes between loci of adjacent frames.

3. The method of claim 2, wherein defining a path of the matchable characteristics within the frame group includes performing a matrix analysis of the data set classes for ascertaining a high confidence pathway.

4. The method of claim 3, wherein defining a path of the matchable characteristics within the frame group include selecting the high confidence pathway between similar data set classes.

5. The method of claim 3, wherein defining a path of the matchable characteristics within the frame group include selecting the high confidence pathway between dissimilar data set classes.

6. The method of claim 3, wherein defining a path of the matchable characteristics within the frame group include selecting the high confidence pathway between similar and dissimilar data set classes.

7. A method for replacing bookmarks in digital media files comprising:
   selecting a portion of a digital media file;
   detecting the location of an original bookmark associated with the portion, wherein detecting the original bookmark includes using a fingerprinting algorithm;
   ascertaining data set classes within the portion of the digital media file, wherein ascertaining data set classes within the portion of the media file include examining for the presence of at least one of a pixel luminescence value, a region of pixel luminescence values an indicator of object motion, a change in sound volume, or a change in sound types;
   applying a replacement bookmark to associate with the data set classes, wherein applying a replacement bookmark to associate with the data set classes includes determining the matchable characteristics present in a video frame group of a media file;
   overwriting the original bookmark with the replacement bookmark; and
   subjecting the replacement bookmark to a fingerprint matching algorithm that incorporates media timeline and media related metadata.

8. The method of claim 7, wherein determining the matchable characteristics present in a video frame group includes ascertaining the location of at least one of the pixel luminescence value, the region of pixel luminescence values, the indicator of object motion, the change in sound volume, or the change in sound types.

9. The method of claim 8, wherein determining the matchable characteristics present in the video frame group includes establishing a vector pathway between matchable characteristics.

10. The method of claim 9, wherein establishing the vector pathway between matchable characteristics include selecting for a high confidence pathway determined by matrix analysis of the matchable characteristics.

11. The method of claim 10, wherein selecting for a high confidence pathway includes vector pathway between similar matchable characteristics, dissimilar matchable characteristics, and a combination of similar and dissimilar matchable characteristics.

12. A system for generating video fingerprints comprising:
    an original digital media file having at least one of a video digital file or an audio digital file;
    means for identifying a region within the original media file, wherein the means for identifying a region within the original media file includes a region analysis algorithm configured to detect matchable characteristics comprising at least one of a pixel luminescence value, a region of pixel luminescence values, an indicator of object motion, a change in sound volume, or a change in sound types;
    means for bookmarking the identified region with a fingerprinting algorithm;
    means for detecting a bookmarked region of a duplicate of the original digital media file using the fingerprinting algorithm; and
    means for comparing the bookmarked region of the original media file to the bookmarked region of the duplicate.

13. The system of claim 12, wherein the means for comparing the bookmarked region of the original media file to the bookmarked region of the duplicate includes determining a vector pathway between the matchable characteristics.

* * * * *